(12) United States Patent
Kubota (10) Patent No.: US 11,301,026 B2
(45) Date of Patent: Apr. 12, 2022

(54) INFORMATION PROCESSING APPARATUS HAVING VOLATILE MEMORY USED TO CACHE WRITE DATA TO NONVOLATILE MEMORY, POWER SUPPLY METHOD THEREFOR, AND STORAGE MEDIUM STORING PROGRAM THEREFOR

(71) Applicant: CANON KABUSHIKI KAISHA, Tokyo (JP)

(72) Inventor: Tsutomu Kubota, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 16/788,693

(22) Filed: Feb. 12, 2020

(65) Prior Publication Data
US 2020/0285299 A1 Sep. 10, 2020

(30) Foreign Application Priority Data
Mar. 8, 2019 (JP) .............................. JP2019-042776

(51) Int. Cl.
*G06F 1/32* (2019.01)
*G06F 1/3234* (2019.01)
*G06F 1/3246* (2019.01)
*G06F 12/0804* (2016.01)
*G06F 1/3203* (2019.01)

(52) U.S. Cl.
CPC .......... *G06F 1/3275* (2013.01); *G06F 1/3246* (2013.01); *G06F 12/0804* (2013.01); *G06F 1/3203* (2013.01); *G06F 2212/1032* (2013.01)

(58) Field of Classification Search
CPC .. G06F 1/3275; G06F 1/3246; G06F 12/0804; G06F 2212/1032
USPC ........................................................ 713/320
See application file for complete search history.

(56) References Cited

U.S. PATENT DOCUMENTS

| | | | | |
|---|---|---|---|---|
| 5,881,012 A * | 3/1999 | Kawasaki | ............ | H03K 17/063 365/226 |
| 2003/0154230 A1* | 8/2003 | Harada | ............ | G01R 19/16552 708/801 |
| 2003/0161190 A1* | 8/2003 | Fujioka | .................. | G11C 5/145 365/189.09 |
| 2007/0014176 A1* | 1/2007 | Krenzke | ................ | G11C 5/147 365/226 |

(Continued)

FOREIGN PATENT DOCUMENTS

| | | |
|---|---|---|
| JP | H09330277 A | 12/1997 |
| JP | 2010160654 A | 7/2010 |

*Primary Examiner* — Volvick Derose
(74) *Attorney, Agent, or Firm* — Rossi, Kimms & McDowell LLP (57) ABSTRACT

An information processing apparatus that is capable of securing electric power needed to complete data writing to a nonvolatile memory even if supplied voltage drops. The information processing apparatus includes a nonvolatile memory, a volatile memory that caches write data to the nonvolatile memory. A first power supply unit generates electric power supplied to the nonvolatile memory and the volatile memory by a switching operation. A power source controller lowers a switching frequency of the first power supply unit and controls the first power supply unit to supply the electric power to the nonvolatile memory and the volatile memory in a case where voltage supplied to the information processing apparatus drops.

9 Claims, 8 Drawing Sheets

(56) References Cited

U.S. PATENT DOCUMENTS

| | | | |
|---|---|---|---|
| 2009/0132114 A1* | 5/2009 | Torsten | G05B 19/042 |
| | | | 701/36 |
| 2010/0332858 A1* | 12/2010 | Trantham | G06F 1/30 |
| | | | 713/300 |
| 2011/0271048 A1* | 11/2011 | Fuji | G06F 11/1441 |
| | | | 711/113 |
| 2012/0054520 A1* | 3/2012 | Ben-Tsion | G06F 1/30 |
| | | | 713/322 |
| 2013/0265841 A1* | 10/2013 | Duzly | G11C 16/32 |
| | | | 365/228 |
| 2014/0215130 A1* | 7/2014 | Chen | G06F 1/3287 |
| | | | 711/103 |
| 2016/0239079 A1* | 8/2016 | Yuasa | G06F 1/263 |

* cited by examiner

PWM: Cycle is constant and ratio of ON period and OFF period varies.

PFM: ON Period is constant, OFF Period and cycle vary.

| Switching Frequency | Low (to several handled kHz) | High (from 1 MHz) |
|---|---|---|
| Part Size | Large | Small |
| Efficiency | Rise | Drop |
| Ripple | Large | Small |
| Transient Response | Slow | Fast |

INFORMATION PROCESSING APPARATUS HAVING VOLATILE MEMORY USED TO CACHE WRITE DATA TO NONVOLATILE MEMORY, POWER SUPPLY METHOD THEREFOR, AND STORAGE MEDIUM STORING PROGRAM THEREFOR

BACKGROUND OF THE INVENTION

Field of the Invention

The present invention relates to an information processing apparatus having a volatile memory used to cache write data to a nonvolatile memory, a power supply method therefor, and a storage medium storing a program therefor.

Description of the Related Art

There are some information processing apparatuses that can use a flash memory module, for example. A flash memory module has a nonvolatile memory that holds data even without power and a volatile memory that is used to cache write data to the nonvolatile memory. A flash controller of the flash memory module performs a flash caching operation that writes data cached in the volatile memory into the nonvolatile memory.

Moreover, the flash controller reads data from the nonvolatile memory and performs a garbage collection process that releases a used area of the nonvolatile memory to ensure a writable area. An apparatus controller of the information processing apparatus controls access to the flash memory module to write data used in the apparatus to the flash memory module and to read data used in the apparatus from the flash memory module.

The flash memory module temporarily caches the data that will be written to the nonvolatile memory into the volatile memory. The flash memory module writes data saved in the volatile memory to the nonvolatile memory for every predetermined data amount. When the power supply to the information processing apparatus stops before completing the writing to the nonvolatile memory, the nonvolatile memory cannot hold all the write data. Accordingly, the information processing apparatus may lose the data written to the flash memory module.

There is a known technique to provide a capacitor or a battery between the power connector of the information processing apparatus and the flash memory module (see Japanese Laid-Open Patent Publication (Kokai) No. 2010-160654 (JP 2010-160654A) or Japanese Laid-Open Patent Publication (Kokai) No. H9-330277 (JP H9-330277A)). In a state where the power supply to the information processing apparatus stops, the data writing to the nonvolatile memory is completed using accumulated electric power of the capacitor or the battery. However, a capacity of a flash memory module is increasing. Accordingly, even if such measures are taken, the information processing apparatus may not accumulate and secure electric power needed to complete the data writing to the nonvolatile memory with the capacitor or the battery. The information processing apparatus may need to have a large capacitor or battery in order to use a flash memory module that is compact and highly convenient.

SUMMARY OF THE INVENTION

The present invention provides an information processing apparatus, a power supply method, and a storage medium storing a program, which are capable of securing electric power needed to complete data writing to a nonvolatile memory.

Accordingly, a first aspect of the present invention provides an information processing apparatus including a nonvolatile memory, a volatile memory that caches write data to the nonvolatile memory, a first power supply unit that generates electric power supplied to the nonvolatile memory and the volatile memory by a switching operation, and a power source controller that lowers a switching frequency of the first power supply unit and that controls the first power supply unit to supply the electric power to the nonvolatile memory and the volatile memory in a case where voltage supplied to the information processing apparatus drops.

Accordingly, a second aspect of the present invention provides a power supply method for an information processing apparatus having a volatile memory that caches write data to nonvolatile memory, the power supply method including detecting a drop in voltage supplied to the information processing apparatus, and lowering a switching frequency of a switching operation for generating electric power supplied to the nonvolatile memory and the volatile memory in a case where the drop in voltage is detected.

Accordingly, a third aspect of the present invention provides a non-transitory computer-readable storage medium storing a control program causing a computer to execute the power supply method of the second aspect.

According to the present invention, the electric power needed to write data saved in the volatile memory to the nonvolatile memory is securable.

Further features of the present invention will become apparent from the following description of exemplary embodiments with reference to the attached drawings.

DESCRIPTION OF THE EMBODIMENTS

Hereafter, embodiments according to the present invention will be described in detail by referring to the drawings.

Configurations described in the following embodiments are only examples, and the scope of the present invention is not limited by the configurations described in the embodiments.

Figure 1:
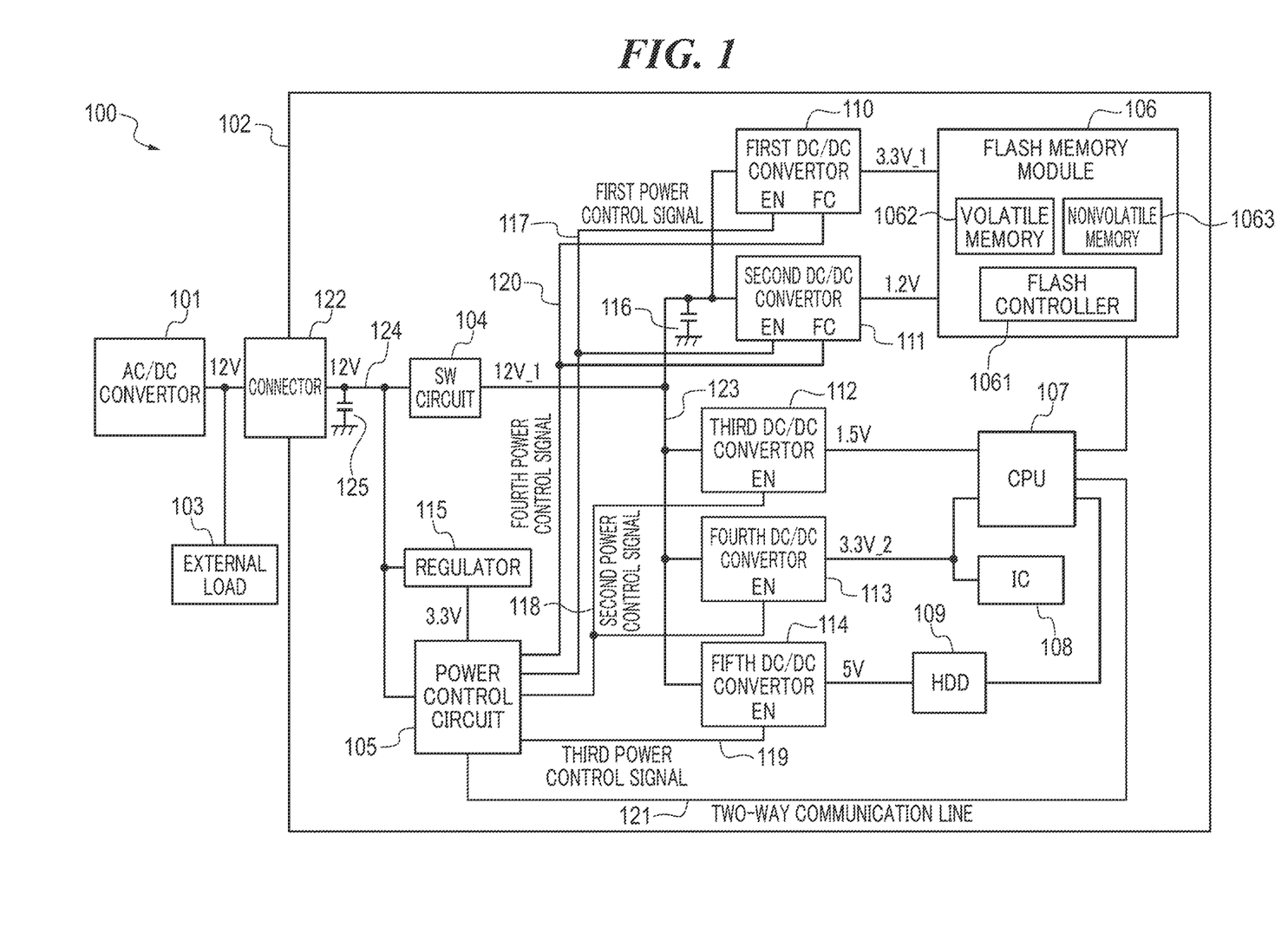
FIG. 1 is a block diagram schematically showing a configuration of an information processing apparatus concerning an embodiment of the present invention.

FIG. 1 is a block diagram schematically showing a configuration of an information processing apparatus concerning the embodiment of the present invention. The information processing apparatus 100 in FIG. 1 has an apparatus 102, external load 103, and AC/DC convertor 101. The apparatus 102 performs a predetermined process under computer control using data.

The apparatus 102 is a computer apparatus or an image forming apparatus like an MFP, for example. The external load 103 is a load apparatus that is separated from the apparatus 102. When the apparatus 102 is an image forming apparatus, the external load 103 may be a computer apparatus that uses the image forming apparatus as a peripheral device. The AC/DC convertor 101 is connected to the apparatus 102 and external load 103. The AC/DC convertor 101 generates electric power of direct current voltage from commercial alternating current power and supplies it to the apparatus 102 and external load 103 that are connected. The AC/DC convertor 101 generates electric power of a direct current voltage of 12V for example.

The apparatus 102 has a flash memory module 106, a CPU 107, an IC 108, and a hard disk device (HDD) 109 as load devices that consume the electric power and operate. The apparatus 102 has a connector 122, switching circuit 104, power control circuit 105, first through fifth DC/DC convertors 110 through 114, regulator circuit 115, and capacitor 116 for voltage-drop compensation in order to supply the electric power to the load devices of the apparatus 102. The hard disk device 109 is a storage device of the information processing apparatus 100. The hard disk device 109 stores a program that the CPU 107 runs.

The CPU 107 reads a program from the hard disk device 109 and runs. Thereby, the CPU 107 achieves an apparatus control unit that totally controls actions of respective sections of the information processing apparatus 100. The CPU 107 as the apparatus control unit performs a read access to the hard disk device 109 or the flash memory module 106, and reads data that is needed for a process of the information processing apparatus 100. The CPU 107 performs a write access to the hard disk device 109 or the flash memory module 106, and writes data generated by a process of the information processing apparatus 100. The IC 108 performs a specific process in the information processing apparatus 100. The IC 108 performs an image process for a print, scan, and copy, for example. The IC 108 may directly access the hard disk device 109 and the flash memory module 106.

The flash memory module 106 has a nonvolatile memory 1063, volatile memory 1062, and flash controller 1061. The flash memory module 106 may be detachably attached to the apparatus 102. The nonvolatile memory 1063 holds data even without electric power. The nonvolatile memory 1063 is a NAND type flash memory, for example. The flash memory allows to write data into a recording area in which no data is written.

The volatile memory 1062 is used for caching write data to the nonvolatile memory 1063. The volatile memory 1062 consists of a RAM, for example. The flash controller 1061 caches write data into the volatile memory 1062 at a time of write access of the flash memory module 106 to the nonvolatile memory 1063. When a predetermined amount of the write data are cached in the volatile memory 1062, the flash controller 1061 performs a flash cache process that writes the write data into the nonvolatile memory 1063.

In the cache flash process, the write data in the volatile memory 1062 is written into a recording area in which no data is written for every unit amount, such as a block of the nonvolatile memory 1063. The flash controller 1061 performs a garbage collection process that releases a used recording area to enable writing of new data when the writable recording area runs short. At a time of the read access to the nonvolatile memory 1063 of the flash memory module 106, the flash controller 1061 reads data from the nonvolatile memory 1063 or the volatile memory 1062 and outputs the data.

Executions of such various kinds of processes enable a rapid write access to the flash memory module 106 even when the writing speed of the nonvolatile memory 1063 is slower than the data transfer speed of the SATA interface. Moreover, the number of times of writing to the nonvolatile memory 1063 can be reduced.

The connector 122 is connected to the AC/DC convertor 101. The voltage that is supplied to the information processing apparatus 100 is input into the connector 122. The switching circuit 104 is connected with power supply lines 123 and 124 between the connector 122 and the DC/DC convertors 110 through 114. The switching circuit 104 connects the DC/DC convertors 110 through 114 to the connector 122 in an ON state. The switching circuit 104 separates the DC/DC convertors 110 through 114 from the connector 122 in an OFF state.

Each of the DC/DC convertors 110 through 114 performs a switching operation at a switching frequency set by an FC terminal or a fixed switching frequency when a significant enable signal is input into an EN terminal. Each of the DC/DC convertors 110 through 114 converts input voltage by a switching operation and outputs electric power of a predetermined output voltage. Each of the DC/DC convertors 110 through 114 stops the action when the significant enable signal is not input.

The first DC/DC convertor 110 is connected to the flash memory module 106. The first DC/DC convertor 110 generates electric power of a voltage of 3.3V and supplies it to the flash memory module 106.

The second DC/DC convertor 111 is connected with the flash memory module 106. The second DC/DC convertor 111 generates electric power of a voltage of 1.2V and supplies it to the flash memory module 106.

The third DC/DC convertor 112 is connected with the CPU 107. The third DC/DC convertor 112 generates electric power of a voltage of 1.5V and supplies it to the CPU 107.

The fourth DC/DC convertor 113 is connected with the CPU 107 and IC 108. The fourth DC/DC convertor 113 generates electric power of a voltage of 3.3V and supplies it to the CPU 107 and IC 108.

The fifth DC/DC convertor 114 is connected with the hard disk device 109. The fifth DC/DC convertor 114 generates electric power of a voltage of 5V and supplies it to the hard disk device 109.

The first and second DC/DC convertors 110 and 111 function as a first power supply unit that generates the electric power supplied to the nonvolatile memory 1063 and volatile memory 1062 of the flash memory module 106 by the switching operation.

The third, fourth, and fifth DC/DC convertors 112, 113, and 114 function as a second power supply unit that supplies electric power to sections other than the flash memory module 106 in the information processing apparatus 100. Each of the first and second power supply units generates electric power by converting the voltage that is supplied to the information processing apparatus 100 through the connector 122 by the switching operation.

The capacitor 116 for voltage-drop compensation is connected to the power supply line 123 lying from the switching circuit 104 to the DC/DC convertors 110 through 114. Thereby, the capacitor 116 is connected between the connector 122 and the first and second power supply units. The capacitor 116 has a capacity that allows the flash memory module 106 to perform a cache flash operation at the time of voltage drop.

It should be noted that the capacitor 116 may be unnecessary when a wiring capacity of the power supply line 123 lying from the switching circuit 104 to the DC/DC convertors 110 through 114 is large. Moreover, another capacitor 125 may be connected to the power supply line 124 lying from the connector 122 to the switching circuit 104 as shown in FIG. 1.

The regulator circuit 115 converts input voltage by the switching operation at a fixed switching frequency as with the DC/DC convertors, for example, and outputs electric power of a predetermined output voltage. The regulator circuit 115 supplies the electric power of a voltage of 3.3V to the flash memory module 106.

The power control circuit 105 is connected to the connector 122 and regulator circuit 115 through the power supply line 124. The power control circuit 105 has a CPU and memory (not shown), for example, and the CPU reads a program recorded in the memory and runs it. The power control circuit 105 is connected with the DC/DC convertors 110 through 114 through the control lines 117 through 120. The power control circuit 105 controls actions and switching frequencies of the DC/DC convertors 110 through 114.

The power control circuit 105 is connected to the CPU 107 by a two-way communication line 121. The power control circuit 105 and the CPU 107 output signals bidirectionally. Thereby, the power control circuit 105 functions as a power source controller that controls actions of the first and second power supply units and controls power supply in the information processing apparatus 100. The power control circuit 105 functions as a power source controller that is directly connected to the connector 122 without interposing the first and second power supply units.

Incidentally, the CPU 107 as an apparatus controller of the information processing apparatus 100 controls an access to the flash memory module 106. For example, the CPU 107 writes data that is used in the apparatus into the flash memory module 106. The CPU 107 reads data that is used in the apparatus from the flash memory module 106.

The flash memory module 106 temporarily caches the data that will be written to the nonvolatile memory 1063 into the volatile memory 1062. After that, the flash memory module 106 writes the data cached in the volatile memory 1062 into the nonvolatile memory 1063 for every predetermined data amount.

Then, when the power supply to the information processing apparatus 100 stops owing to a power cut etc. before completing the writing to the nonvolatile memory 1063, the nonvolatile memory 1063 cannot hold all the write data. Even if a power cut is momentary, the information processing apparatus 100 may lose the data written in the flash memory module 106. Even if the capacitor 116 for voltage-drop compensation is provided, the information processing apparatus 100 may lose the data written in the flash memory module 106. In this way, the information processing apparatus 100 is required to secure the electric power needed to write data cached in the volatile memory 1062 into the nonvolatile memory 1063 of the flash memory module 106.

Basically, a DC/DC convertor shown in FIG. 1 induces voltage in an inductor connected to a load side of a switching element like an FET (not shown) by driving the switching element and charges a capacitor connected to a load side of the inductor. The voltage accumulated in the capacitor becomes the output voltage of the DC/DC convertor. The output voltage of the DC/DC convertor is smoothed by the inductor and capacitor so as to be direct current voltage. The output voltage of the DC/DC convertor is adjustable by adjusting a driving pulse width of the switching element.

Figure 2:
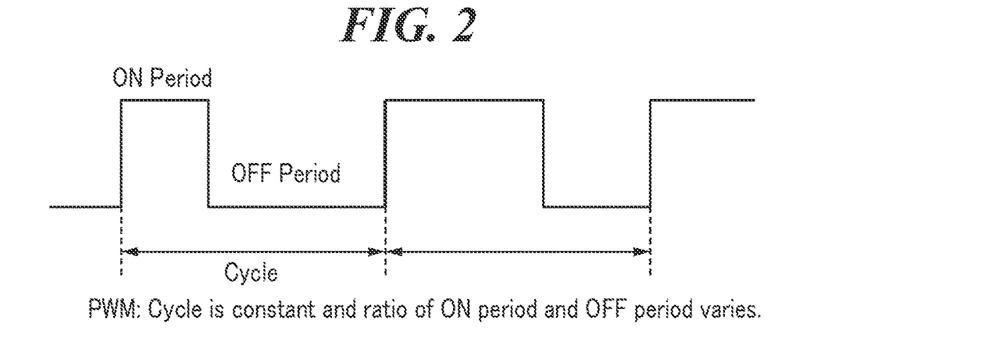
FIG. 2 is an explanatory view showing a switching waveform of a DC/DC convertor in a PWM operation.
Figure 3:
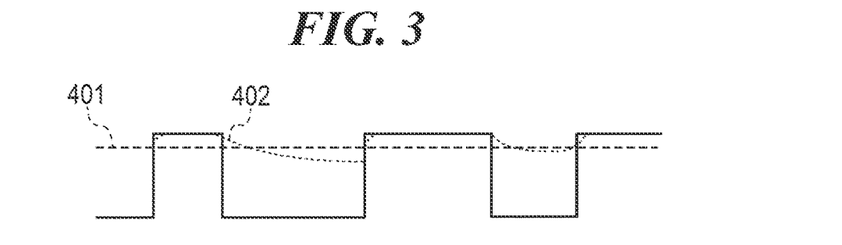
FIG. 3 is an explanatory view schematically showing an output voltage waveform of the DC/DC convertor in the PWM operation.

FIG. 2 is an explanatory view showing a switching waveform of a DC/DC convertor in a PWM (Pulse Width Modulation) operation. FIG. 3 is an explanatory view schematically showing an output voltage waveform of the DC/DC convertor in the PWM operation. As shown in FIG. 2, the PWM adjusts a duty ratio (ratio of an ON period and OFF period) while keeping a switching frequency (cycle) constant. In this case, as shown in FIG. 3, the output voltage becomes high in the ON period and drops in the OFF period. Ripple voltage 402 in the OFF period is lower than the voltage in the ON period. An average output voltage 401 in the PWM operation becomes lower than the voltage in the ON period under the influence of the ripple voltage 402.

Figure 4:
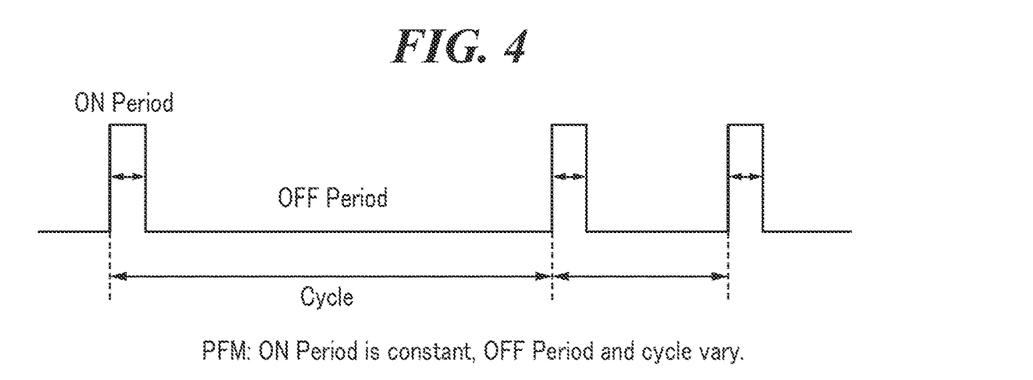
FIG. 4 is an explanatory view showing a switching waveform of the DC/DC convertor in a PFM operation.
Figure 5:
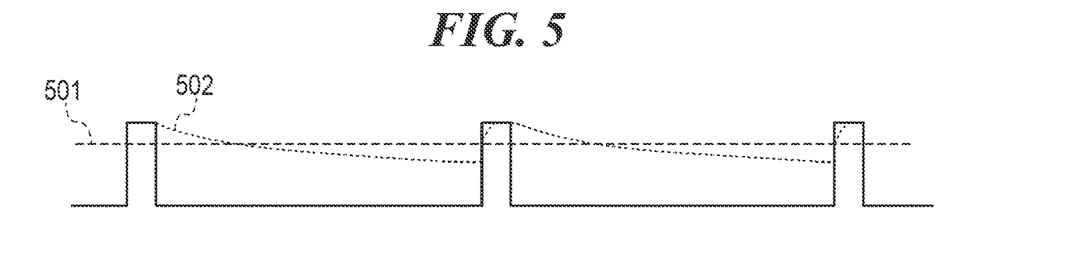
FIG. 5 is an explanatory view schematically showing an output voltage waveform of the DC/DC convertor in the PFM operation.

FIG. 4 is an explanatory view showing a switching waveform of the DC/DC convertor in a PFM (Pulse Frequency Modulation) operation. FIG. 5 is an explanatory view schematically showing an output voltage waveform of the DC/DC convertor in the PFM operation. As shown in FIG. 4, the PFM method adjusts the switching frequency (cycle) while keeping the ON period constant. In this case, as shown in FIG. 5, the output voltage becomes high in the ON period and drops in the OFF period. Ripple voltage 502 in the OFF period is lower than the voltage in the ON period. An average output voltage 501 in the PFM operation becomes lower than the voltage in the ON period under the influence of the ripple voltage 502. Since a switching interval in the PFM method becomes wider, the voltage drop due to the ripple voltage tends to be larger than that in the PWM method. A DC/DC convertor tends to employ the PWM operation when power consumption of load is large (heavy load) and to employ the PFM operation in a case of light load.

Figure 6:
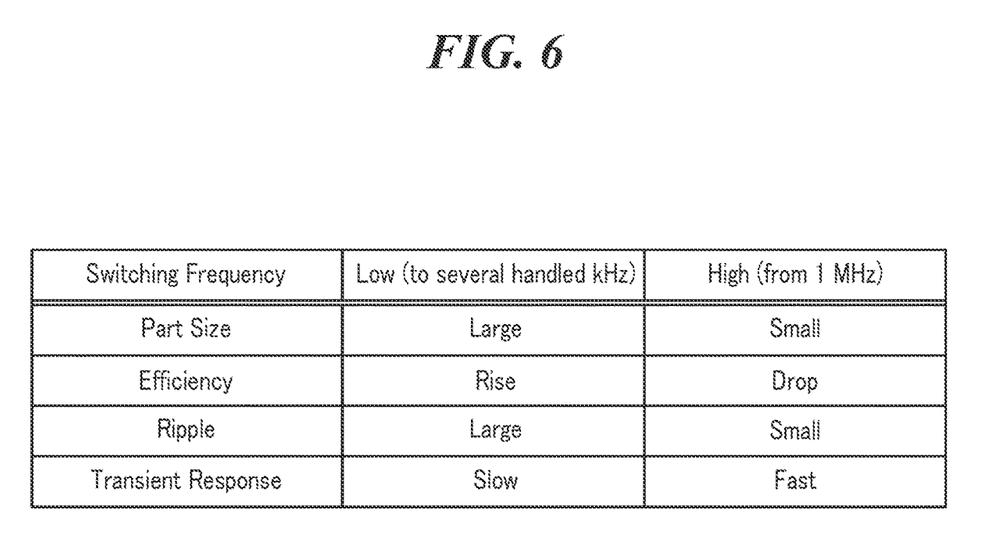
FIG. 6 is an explanatory view showing qualitative characteristic features of the DC/DC convertor in FIG. 1 for different two switching frequencies.

FIG. 6 is an explanatory view showing qualitative characteristics of the DC/DC convertor in FIG. 1 for two different switching frequencies. FIG. 6 shows the characteristics in the case of high switching frequency and the characteristics in the case of low switching frequency separately. In the case of high switching frequency, since the inductor and capacitor of the DC/DC convertor can be miniaturized, a part size of the DC/DC convertor is also miniaturized. Moreover, the ripple of the output voltage becomes small. A transient response becomes fast. However, conversion efficiency drops.

As compared with this, in the case of low switching frequency, since the inductor and capacitor of the DC/DC convertor become large, the part size also becomes large. Moreover, the ripple of the output voltage becomes large. The transient response becomes slow. However, the conversion efficiency rises. One cause of the drop in the conversion efficiency is that the electric current consumption accompanying conversion becomes large to load current. The electric current consumption accompanying conversion includes electric current that the switching element consumes by the switching operation. When the number of times of ON/OFF of the switching element increases, the current magnitude consumed by the switching operations also increases.

Figure 7:
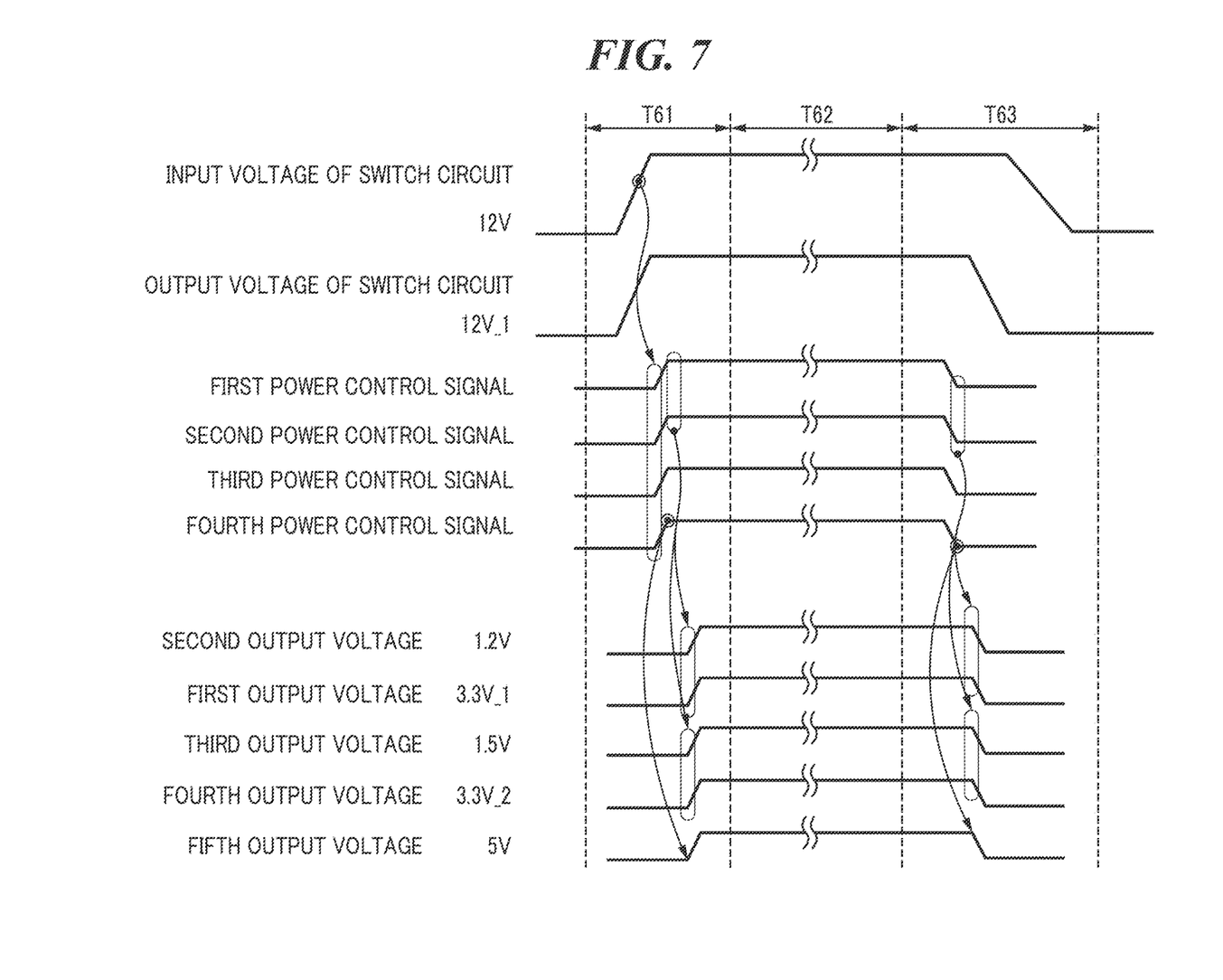
FIG. 7 is a timing chart schematically showing power supplying states of the information processing apparatus in FIG. 1 up to stopping from starting in a normal condition.

FIG. 7 is a timing chart schematically showing power supplying states of the information processing apparatus in FIG. 1 up to stopping from starting in a normal condition. FIG. 7 shows the following charts sequentially from the top: input voltage of the switching circuit 104, output voltage of the switching circuit 104, a first power control signal that the power control circuit 105 outputs to the first and second DC/DC convertors 110 and 111 through the control line 117, a second power control signal that the power control circuit 105 outputs to the third and fourth DC/DC convertors 112 and 113 through the control line 118, a third power control signal that the power control circuit 105 outputs to the fifth DC/DC convertor 114 through the control line 119, a fourth power control signals that the power control circuit 105 outputs to the first and second DC/DC convertors 110 and 111 through the control line 120, second output voltage that the second DC/DC convertor 111 outputs to the flash memory module 106, first output voltage that the first DC/DC convertor 110 outputs to the flash memory module 106, third output voltage that the third DC/DC convertor 112 outputs to the CPU 107, fourth output voltage that the fourth DC/DC convertor 113 outputs to the CPU 107 and IC 108, and fifth output voltage that the fifth DC/DC convertor 114 outputs to the hard disk device 109.

A period T61 in FIG. 7 is a starting period within which the information processing apparatus 100 starts and reaches a normal operation. A period T62 is a regular period during which the information processing apparatus 100 is normally operated. A period T63 is a shutdown period within which the information processing apparatus 100 that is normally operated will shut down.

In the starting period T61, the electric power of the voltage of 12V is input to the switching circuit 104 from the AC/DC convertor 101 through the connector 122. When the switching circuit 104 turns ON by pull-up (not shown) of 12V, it outputs the electric power of the voltage of 12V_1. The electric power of the voltage of 3.3V generated by the regulator is supplied to the power control circuit 105. The power control circuit 105 starts the power control to activate the information processing apparatus 100. The power control circuit 105 outputs high-level control signals to the DC/DC convertors 110 through 114.

Receiving the high-level control signals, the DC/DC convertors 110 through 114 start voltage conversion actions at the respective switching frequencies and start supplying the electric power to the loads connected to the respective convertors. For example, the first and second DC/DC convertor 110 and 111 respectively start the switching operations at high switching frequencies, when the fourth power control signal becomes "H (high-level)". Moreover, the first and second DC/DC convertors 110 and 111 start outputting a first output voltage of 3.3V_1 and a second output voltage of 1.2V, respectively, when the first power control signal becomes "H".

The third and fourth DC/DC convertors 112 and 113 start outputting a third output voltage of 1.5V and a fourth output voltage of 3.3V_2, respectively, when the second power control signal becomes "H". The fifth DC/DC convertor 114 starts outputting a fifth output voltage of 5V, when the third power control signal becomes "H". The respective sections of the information processing apparatus 100 start normal operations during the regular period T62 because the electric power is supplied. The flash controller 1061 also starts the normal operation.

When a user turns a power switch OFF, the CPU 107 starts a shutdown process for finishing the operations of the information processing apparatus 100. In the shutdown process, the CPU 107 instructs the flash memory module 106 to write the data that is remaining in the volatile memory 1062 into nonvolatile memory 1063. In response to the cache flash operation start instruction from the CPU 107, the flash controller 1061 writes the write data of the volatile memory 1062 into the nonvolatile memory 1063. When the cache flash operation of the flash memory module 106 is completed, the CPU 107 performs an unmounting process about the flash memory module 106.

Moreover, the CPU 107 instructs the hard disk device 109 to write cache data if needed. When the writing of the cache data in the hard disk device 109 is completed, the CPU 107 performs an unmounting process about the hard disk device 109.

When the saving process of the cached write data is completed, the CPU 107 instructs the power control circuit 105 to start a shutdown sequence through the two-way signal line. The power control circuit 105 switches the first, second, and third power control signals to a "L (low)" level during the shutdown period T63.

When the first power control signal becomes "L", the first and second DC/DC convertors 110 and 111 respectively stop outputting the first output voltage of 3.3V_1 and the second output voltage of 1.2V. When the second power control signal becomes "L", the third and fourth DC/DC convertors 112 and 113 respectively stop outputting the third output voltage of 1.5V and the fourth output voltage of 3.3V_2. When the third power control signal becomes "L", the fifth DC/DC convertor 114 stops outputting the fifth output voltage of 5V. When the power supply from the DC/DC convertors 110 through 114 stops, the respective sections of the information processing apparatus 100 stop the operations. The information processing apparatus 100 shuts down and stops the operation.

Figure 8:
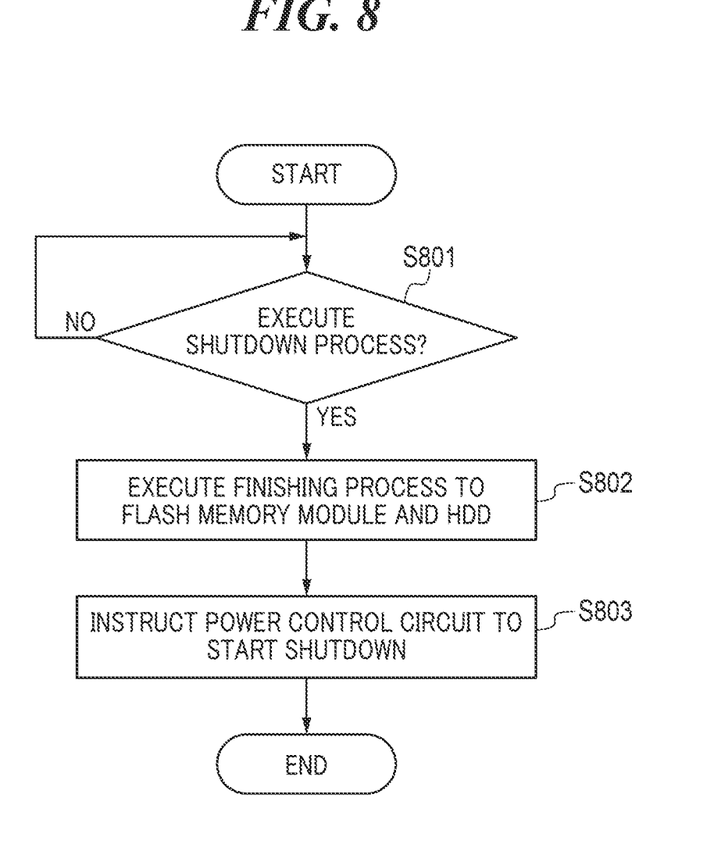
FIG. 8 is a flowchart showing an example of a shutdown process executed by a CPU in FIG. 1.

FIG. 8 is a flowchart showing an example of the shutdown process executed by the CPU 107 in FIG. 1. In step S801 of the shutdown process in FIG. 8, the CPU 107 determines whether the shutdown process is executed. When not executing the shutdown process, the CPU 107 repeats the determination in the step S801. When executing the shutdown process, the CPU 107 proceeds with the process to step S802. In the step S802, the CPU 107 instructs the flash memory module 106 and hard disk device 109 to complete the writing of the cached write data (a termination process). In the next step S803, the CPU 107 instructs the power control circuit 105 to start the shutdown sequence.

Figure 9:
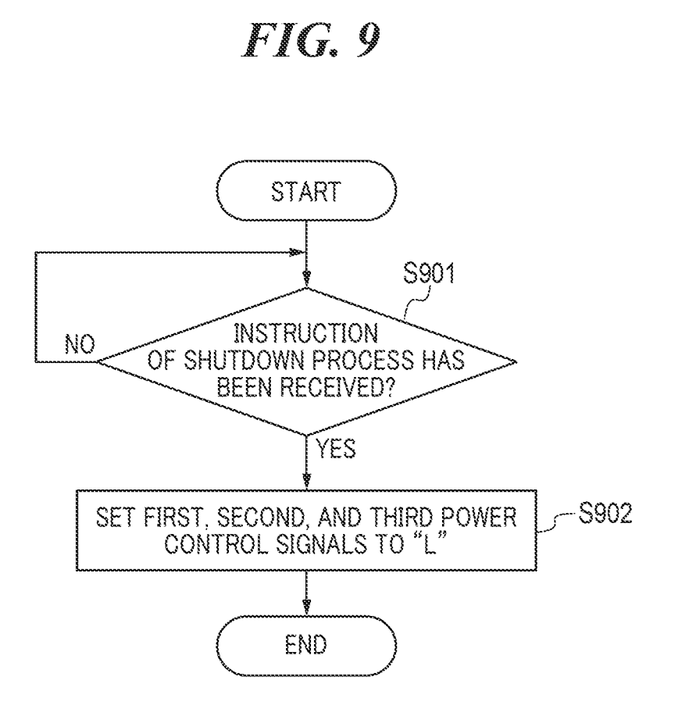
FIG. 9 is a flowchart showing an example of a shutdown sequence executed by a power control circuit in FIG. 1.

FIG. 9 is a flowchart showing an example of the shutdown sequence executed by the power control circuit 105 in FIG. 1. In step S901 of the shutdown sequence in FIG. 9, the power control circuit 105 determines whether a start instruction of the shutdown process has been received from the CPU 107. When not having received the start instruction of the shutdown process, the power control circuit 105 repeats the determination in the step S901. When receiving the start instruction of the shutdown process, the power control circuit 105 proceeds with the process to step S902. In the step S902, the power control circuit 105 switches the first, second, and third power control signals supplied through the control lines 117 through 119 to the "L (low)" level.

Figure 10:
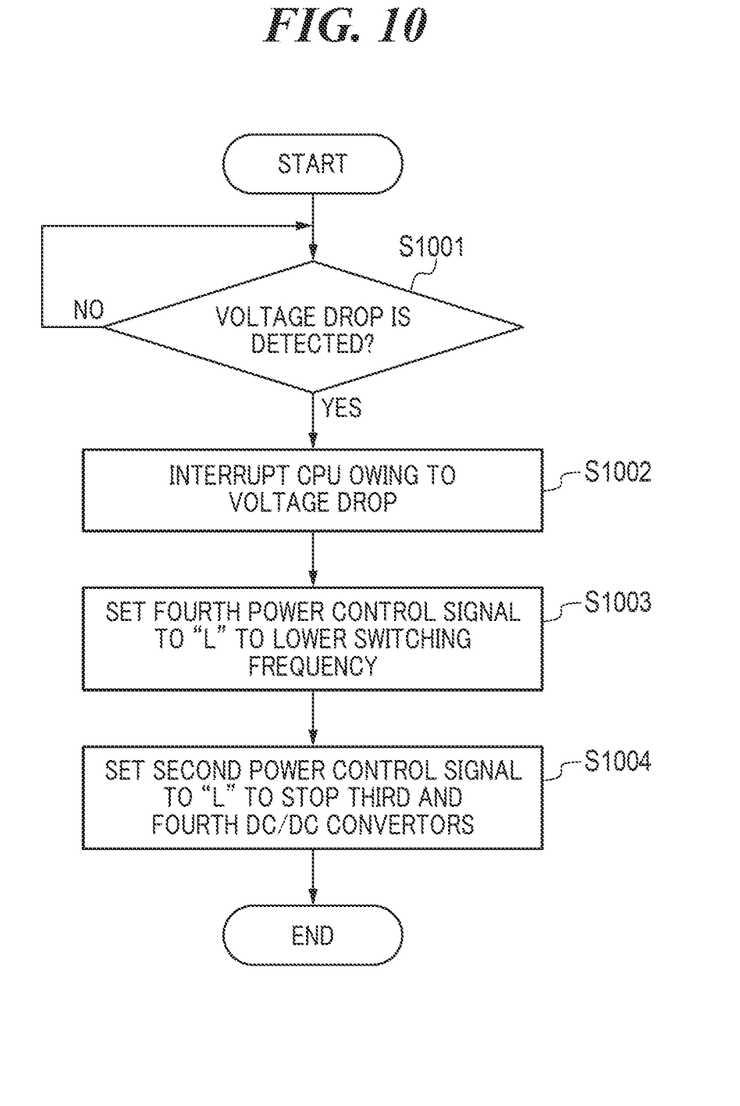
FIG. 10 is a flowchart showing a process of the power control circuit in a case of detecting voltage drop.

FIG. 10 is a flowchart showing a process of the power control circuit 105 in a case of detecting voltage drop. The power control circuit 105 is connected to the connector 122 and monitors the voltage supplied to the information processing apparatus 100 from the AC/DC convertor 101 through the connector 122. When the monitored voltage becomes lower than a predetermined threshold, the power control circuit 105 outputs an interrupt signal to the CPU 107 through the two-way communication line 121. When the interrupt signal is input, the CPU 107 starts the shutdown process.

In step S1001 of a voltage-drop detection process in FIG. 10, the power control circuit 105 determines whether the detected voltage drop of the voltage supplied to the monitoring information processing apparatus 100 to a normal voltage of 12V is more than a normal margin. When no voltage drop is detected, the power control circuit 105 repeats the determination in the step S1001.

When the voltage drop is detected, the power control circuit 105 proceeds with the process to step S1002. In the step S1002, the power control circuit 105 outputs the interrupt signal due to the detection of the voltage drop to the CPU 107 through the two-way communication line 121. The CPU 107 starts the shutdown process. The CPU 107 as an apparatus controller prohibits an access to the nonvolatile memory 1063 of the flash memory module 106, for example. Moreover, the CPU 107 instructs the flash memory module 106 to execute only the cache flash process as a saving process. The flash controller 1061 stops processes, such as a reading process and a refresh process, other than the cache flash process when such processes are executed. The flash controller 1061 writes the write data cached in the volatile memory 1062 into the nonvolatile memory 1063.

In the next step S1003, the power control circuit 105 sets the fourth power control signal (supplied through the signal line 120) to "L". When the fourth power control signal is set to "L", the first and second DC/DC convertors 110 and 111 set the switching frequencies lower than that in the normal operation and continue the switching operations. The first and second DC/DC convertors 110 and 111 as the first power supply unit respectively lower the switching frequencies than the normal frequencies and maintain the voltage outputs. The first output voltage of 3.3V_1 and the second output voltage of 1.2V that are almost the same as that in the normal operation are continuously supplied to the flash memory module 106.

In the next step S1004, the power control circuit 105 sets the second power control signal (supplied through the control line 118) to "L". When the second power control signal becomes "L", the third and fourth DC/DC convertors 112 and 113 respectively stop outputting the third output voltage of 1.5V and the fourth output voltage of 3.3V_2. The third and fourth DC/DC convertors 112 and 113 as the second power supply unit stop the power supply after the CPU 107 prohibits the access to the flash memory module 106, for example. The power control circuit 105 may simultaneously execute the process in the step S1003 and the process in the step S1004.

Figure 11:
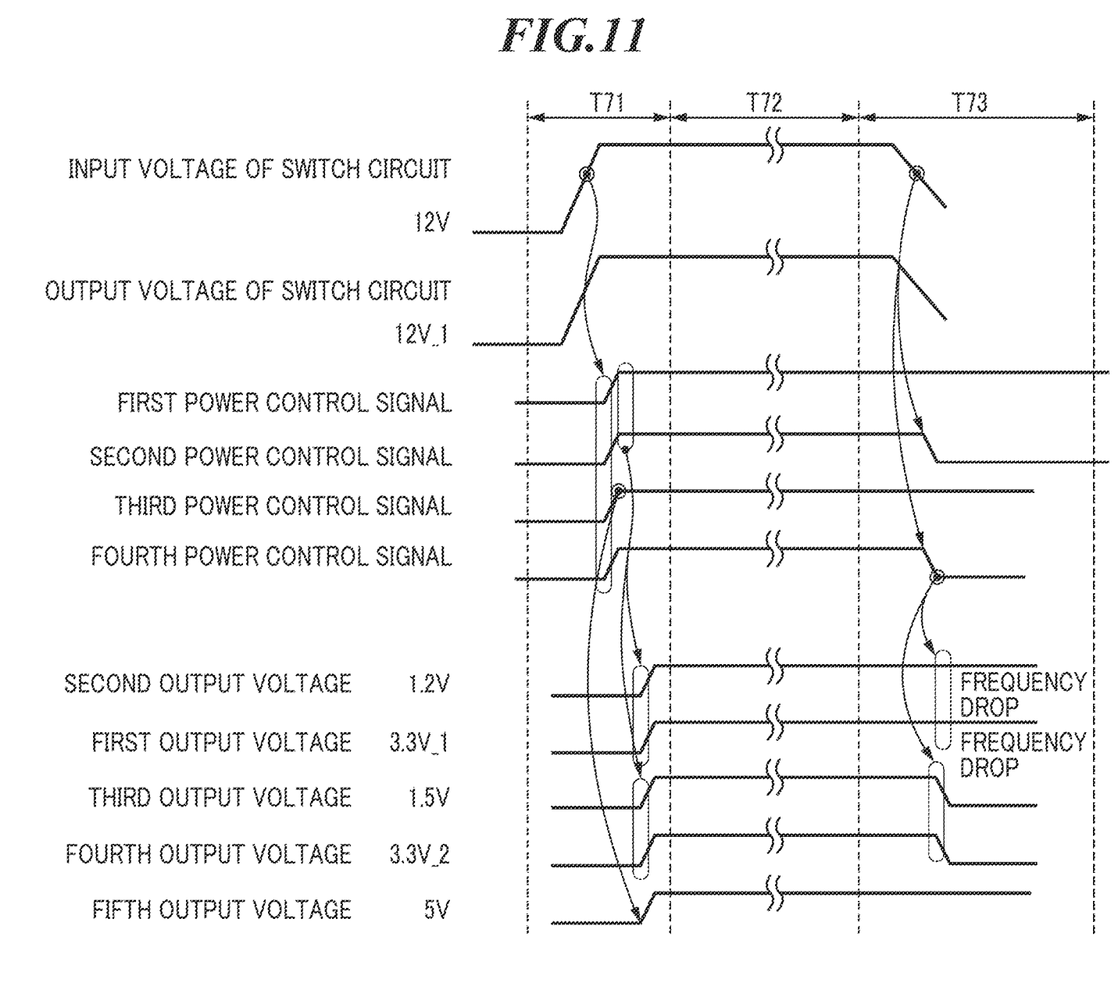
FIG. 11 is a timing chart schematically showing power supplying states of the information processing apparatus in FIG. 1 in the case of detecting voltage drop.

FIG. 11 is a timing chart schematically showing power supplying states of the information processing apparatus 100 in FIG. 1 in the case of detecting voltage drop. Charts in FIG. 11 respectively correspond to the charts in FIG. 7. A period T71 in FIG. 11 corresponds to the starting period T61 in FIG. 7. A period T72 corresponds to the regular period T62 in FIG. 7. A period T73 corresponds to the shutdown period T63 in FIG. 7.

When the voltage supplied to the information processing apparatus 100 drops by power cut etc. during the normal operation as shown in the shutdown period T73, the power control circuit 105 outputs an interrupt signal to the CPU 107 through the two-way communication line 121. When receiving the notice of the voltage drop, the CPU 107 instructs the flash memory module 106 to execute only the cache flash process.

After outputting the interrupt signal, the power control circuit 105 sets the fourth power control signal (supplied through the control line 120) to "L". When the fourth power control signal becomes "L", the first and second DC/DC convertors 110 and 111 respectively lower the switching frequencies and continue outputting the voltage of 3.3V_1 and the voltage of 1.2V.

Moreover, the power control circuit 105 sets the second power control signal (supplied through the control line 118) to "L". When the second power control signal becomes "L", the third and fourth DC/DC convertors 112 and 113 stop outputting the third output voltage of 1.5V and the fourth output voltage of 3.3V_2. On this occasion, the power control circuit 105 maintains the first power control signal (supplied through the control line 117) and the third power control signal (supplied through the control line 119) at the "H" level.

This stops the operations of the loads like the CPU 107 other than the flash memory module 106 in the information processing apparatus 100. The accumulated electric power of the capacitor 116 for voltage drop compensation is supplied to the flash memory module 106. Thereby, the voltage drop of the power supply line 123 to which the capacitor 116 for voltage drop compensation is connected is delayed as compared with a case where such control is not performed.

As mentioned above, when the voltage supplied to the information processing apparatus 100 drops, the first and second DC/DC convertors 110 and 111 as the first power supply unit, which generates the electric power supplied to the nonvolatile memory 1063 and volatile memory 1062 by the switching operation, respectively lower the switching frequencies in this embodiment. The first and second DC/DC convertors 110 and 111 supply the electric power, which is generated at the switching frequencies that are lower than the normal frequencies, to the nonvolatile memory 1063 and volatile memory 1062 of the flash memory module 106.

When the switching frequencies respectively become lower than the normal frequencies, the voltage conversion efficiencies of the first and second DC/DC convertors 110 and 111 rise, which reduces the power consumption due to the voltage conversion.

In this embodiment, the first and second DC/DC convertors 110 and 111 as the first power supply unit supply the electric power to the flash controller 1061. When the voltage supplied to the information processing apparatus 100 drops, the flash controller 1061 performs the saving process that writes the write data cached in the volatile memory 1062 into the nonvolatile memory 1063. The flash controller 1061 does not perform processes, such as a reading process and a refresh process, other than the saving process.

Thereby, the flash controller 1061, volatile memory 1062, and nonvolatile memory 1063 of the flash memory module 106 execute only the process that writes the write data cached in the volatile memory 1062 into the nonvolatile memory 1063.

In this embodiment, when the voltage supplied to the information processing apparatus 100 drops, the CPU 107 as the apparatus controller that controls operations of the respective sections of the information processing apparatus 100 prohibits an access to the nonvolatile memory 1063 of the flash memory module 106. Thereby, the flash controller 1061, volatile memory 1062, and nonvolatile memory 1063 of the flash memory module 106 do not accept the access from the CPU 107 as the apparatus controller. The flash controller 1061 performs only the process that writes the write data cached in the volatile memory 1062 into the nonvolatile memory 1063.

In this embodiment, the third, fourth, and fifth DC/DC convertors 112, 113, and 114 supply the electric power to the sections other than the flash memory module 106 in the information processing apparatus 100. Then, when the voltage supplied to the information processing apparatus 100 drops, the third, fourth, and fifth DC/DC convertors 112, 113, and 114 stop supplying the electric power after the CPU 107 as the apparatus controller prohibits an access to the flash memory module 106. Accordingly, the residual electric power in the information processing apparatus 100 is hard to be consumed by the sections other than the flash controller 1061, volatile memory 1062, and nonvolatile memory 1063 of the flash memory module 106.

As a result, the electric power equivalent to the reduction is supplied to the nonvolatile memory 1063 and volatile memory 1062 of the flash memory module 106 in this embodiment. The nonvolatile memory 1063 and volatile memory 1062 of the flash memory module 106 are capable of securing the electric power needed for the data writing in the information processing apparatus 100. Since the flash memory module 106 performs only the limited operations, the power consumption becomes far smaller than that in the normal time. The capacity required to the capacitor 116 for voltage drop compensation becomes far smaller than that in a case where such control is not performed.

The power control circuit 105 as the power source controller controls operations of the DC/DC convertors 110 through 114 as the first and second power supply units in this embodiment. When the voltage supplied to the information processing apparatus 100 is lowered, the power control circuit 105 stops the power supply of the second power supply unit after lowering the switching frequency of the first power supply unit than the normal frequency. Accordingly, the CPU 107 as the apparatus controller to which the electric power is supplied from the second power supply unit is able to prohibit an access to the nonvolatile memory 1063 of the flash memory module 106. Even though the CPU 107 receives the electric power from the second power supply unit other than the first power supply unit that supplies the electric power to the flash memory module 106, the CPU 107 is able to prohibit an access to the flash memory module 106.

In this embodiment, the capacitor 116 is connected between the connector 122 into which the voltage supplied to the information processing apparatus 100 is input and the DC/DC convertors 110 through 114 that constitute the first and second power supply units. Accordingly, the electric power accumulated in the capacitor 116 can be supplied to the nonvolatile memory 1063 and volatile memory 1062 of the flash memory module 106. Moreover, in this embodiment, the power control circuit 105 as the power source controller is directly connected to the connector 122 without interposing the first and second power supply units. The power control circuit 105 operates with the electric power supplied through the power supply line 124 connected to the connector 122 or with the electric power accumulated in the capacitor 125 connected to the power supply line 124 without being influenced by the operations of the first and second power supply units.

The information processing apparatus 100 is provided with the hard disk device 109 in the above-mentioned embodiment. However, the information processing apparatus 100 may not be provided with the hard disk device 109.

Although the present invention has been described in detail on the basis of the preferred embodiment, the present invention is not limited to the specific embodiment, and various configurations that do not deviate from the gist of the present invention are also included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-042776, filed Mar. 8, 2019, which is hereby incorporated by reference herein in its entirety.

What is claimed is:
1. An information processing apparatus comprising:
a nonvolatile memory;
a volatile memory that caches write data to the nonvolatile memory;
a first power supply unit that generates electric power supplied to the nonvolatile memory and the volatile memory by a switching operation; and
a power source controller that, in a case where voltage supplied to the information processing apparatus drops:
lowers a switching frequency of the first power supply unit so as to raise voltage conversion efficiencies in the switching operation of the first power supply unit so as to reduce power consumption due to voltage conversion; and
controls the first power supply unit to supply the electric power to the nonvolatile memory and the volatile memory.
2. The information processing apparatus according to claim 1, further comprising:

a flash controller that writes the write data cached in the volatile memory into the nonvolatile memory, wherein the first power supply unit supplies the electric power to the flash controller, and the flash controller performs a saving process that writes the write data cached in the volatile memory into the nonvolatile memory in the case where the voltage supplied to the information processing apparatus drops.

3. The information processing apparatus according to claim 1, further comprising:

an apparatus controller that controls operations of sections of the information processing apparatus, wherein the apparatus controller prohibits an access to the nonvolatile memory in the case where the voltage supplied to the information processing apparatus drops.

4. The information processing apparatus according to claim 1, further comprising:

a second power supply unit that supplies electric power to sections other than the volatile memory and the nonvolatile memory in the information processing apparatus, wherein the power source controller stops supplying the electric power by the second power supply unit in the case where the voltage supplied to the information processing apparatus drops.

5. The information processing apparatus according to claim 4, wherein the power source controller stops supplying the electric power by the second power supply unit after lowering the switching frequency of the first power supply unit in the case where the voltage supplied to the information processing apparatus drops.

6. The image processing apparatus according to claim 5, further comprising:

a connector into which the voltage supplied to the information processing apparatus is input; and a capacitor connected between the connector and the first power supply unit and the second power supply unit, wherein each of the first power supply unit and the second power supply unit generates electric power by converting the voltage that is supplied to the information processing apparatus through the connector by the switching operation.

7. The information processing apparatus according to claim 6, wherein the power source controller is connected to the connector without interposing the first power supply unit and the second power supply unit.

8. A power supply method for an information processing apparatus having including a volatile memory that caches write data to a nonvolatile memory, the power supply method comprising:

detecting a drop in voltage supplied to the information processing apparatus; and lowering a switching frequency of a switching operation for generating electric power supplied to the nonvolatile memory and the volatile memory so as to raise voltage conversion efficiencies in the switching operation so as to reduce power consumption due to voltage conversion in a case where the detecting detects the drop in voltage.

9. A non-transitory computer-readable storage medium storing a control program executable by a computer to execute a power supply method for an information processing apparatus including a volatile memory that caches write data to a nonvolatile memory, the power supply method comprising:

detecting a drop in voltage supplied to the information processing apparatus; and lowering a switching frequency of a switching operation for generating electric power supplied to the nonvolatile memory and the volatile memory so as to raise voltage conversion efficiencies in the switching operation so as to reduce power consumption due to voltage conversion in a case where the detecting detects the drop in voltage.

\* \* \* \* \*